(12) United States Patent
Numoto et al.

(10) Patent No.: US 7,527,289 B2
(45) Date of Patent: May 5, 2009

(54) GAS GENERATOR FOR AN AIR BAG

(75) Inventors: Kenji Numoto, Himeji (JP); Naoki Matsuda, Himeji (JP); Teppei Hanano, Himeji (JP)

(73) Assignee: Daicel Chemical Industries, Ltd., Sakai-Shi (JP)

( * ) Notice: Subject to any disclaimer, the term of this patent is extended or adjusted under 35 U.S.C. 154(b) by 341 days.

(21) Appl. No.: 11/063,585

(22) Filed: Feb. 24, 2005

(65) Prior Publication Data

US 2005/0194772 A1    Sep. 8, 2005

Related U.S. Application Data

(60) Provisional application No. 60/547,810, filed on Feb. 27, 2004.

(30) Foreign Application Priority Data

Feb. 25, 2004    (JP)    ............... 2004-048999

(51) Int. Cl.
    *B60R 21/26*    (2006.01)
(52) U.S. Cl. ...................... 280/736; 280/741
(58) Field of Classification Search .................. 280/741
    See application file for complete search history.

(56) References Cited

U.S. PATENT DOCUMENTS 5,345,875 A    9/1994    Anderson

| | | | |
|---|---|---|---|
| 5,630,618 A * | 5/1997 | Hamilton et al. | 280/736 |
| 5,779,267 A * | 7/1998 | Jordan et al. | 280/740 |
| 2003/0047925 A1* | 3/2003 | Edwards et al. | 280/741 |
| 2003/0145921 A1* | 8/2003 | Blomquist et al. | 149/19.2 |
| 2003/0146611 A1* | 8/2003 | Kenney et al. | 280/736 |
| 2004/0075258 A1* | 4/2004 | Kubo et al. | 280/735 |

FOREIGN PATENT DOCUMENTS

| DE | 19900646 A1 | 7/1999 |
|---|---|---|
| DE | 20213555 U1 | 10/2003 |
| DE | 10240639 B3 | 2/2004 |
| JP | 54-116741 | 9/1979 |

* cited by examiner

*Primary Examiner*—Eric Culbreth
(74) *Attorney, Agent, or Firm*—Birch, Stewart, Kolasch & Birch, LLP (57) ABSTRACT

A gas generator for an airbag allows maintaining combustibility as originally designed. An ignition energy generated by an activation of a first igniter 21 flows via a first communication hole 24, a first intermediate chamber 30 and second communication holes 43, into a second combustion chamber 40, to cause a gas generating agent 43 to ignite and burn. The ignition energy flows into the second combustion chamber 40 with making a detour, and therefore, the gas generating agent prevents from broken by the impact and the combustibility thereof is never changed.

11 Claims, 8 Drawing Sheets

GAS GENERATOR FOR AN AIR BAG

This Nonprofessional application claims priority under 35 U.S.C. § 119(e) on U.S. Provisional Application No. 60/547,810 filed on Feb. 27, 2004 and under 35 U.S.C. § 119(a) on patent application Ser. No. 2004-48999 filed in Japan on Feb. 25, 2005, the entire contents of which are hereby incorporated by reference.

BACKGROUND OF THE INVENTION

1. Field of the Invention

The present invention relates to a gas generator for an air bag used in air bag systems for vehicles.

2. Description of the Related Art

In gas generators in which gas generating agents having a solid form (shaped as tablets, cylinders, etc.) are used, ignition energy (a high-temperature gas, a flame, etc.) generated by the activation of an igniter causes a gas generating agent to ignite and burn; or alternatively, a transfer charge is ignited by an igniter, and the released ignition energy causes a gas generating agent to ignite and burn.

In the gas generator, a large shockwave is created upon generation of the ignition energy due to the activation of the igniter; if this shockwave hits the gas generating agent directly, the gas generating agent may break as a result. The fragmentation of the gas generating agent results in an increased surface area of the same, which increases also the amount of gas generated during initial combustion, making thereby impossible to maintain combustibility as originally designed.

U.S. Pat. No. 5,345,875 discloses a gas generator in which a combustion chamber is divided into two by a shockwave barrier 60, one of the combustion chambers (first combustion chamber) faces the activation portion of an igniter 24, and the other combustion chamber (second combustion chamber) communicates with the first combustion chamber through a plurality of communication holes 64 formed in the barrier 60.

In U.S. Pat. No. 5,345,875, the igniter 24 and the two combustion chambers are arranged in series, so that the ignition energy advances directly into the first combustion chamber, and also into the second combustion chamber via the communication holes 64, which might result in a fragmentation of the gas generating agent by the shockwave.

In the constitution of conventional gas generators, the ignition energy generated by the activation of the igniter, in the form of a shockwave, collides directly with the gas generating agent, which may cause the fragmentation of the solid gas generating agent, increasing the surface area thereof and making thereby impossible to maintain combustibility as originally designed.

SUMMARY OF THE INVENTION

An object of the present invention is to provide a gas generator for an air bag whose combustibility can be maintained as originally designed by preventing fragmentation, etc. of a gas generating agent caused by ignition energy.

As a solving means, the present invention provides a gas generator for an air bag comprising, inside a housing having a gas discharge port, an ignition means chamber including an ignition means, and a combustion chamber which is provided adjacent to the ignition means chamber and accommodates therein a gas generating agent adapted to be ignited and burned by the ignition means, wherein the combustion chamber has a gas inflow space in which no gas generating agent exists, and which is surrounded, except for at least one side or one direction, by the housing inner wall surface and the ignition means chamber, the ignition means chamber and the combustion chamber are in communication only through a communication hole(s), the communication hole faces the gas inflow space, and an ignition energy generated by an activation of the ignition means inside the ignition means chamber flows into the gas inflow space via the communication hole, changes its flow direction by colliding against a housing inner wall surface, and causes the gas generating agent inside the combustion chamber to ignite and burn.

The gas generating agent in the gas generator for an air bag according to the present invention is molded into a desired shape, such as a tablet, a cylinder, a pellet, etc. The ignition means may comprise only an igniter or a combination of an igniter with a conventional transfer charge such as B/KNO$_3$ or a conventional gas generating agent (the gas generating agent acts mainly as a transfer charge, though its combustion gas may also be used to inflate the air bag).

The housing of the gas generator for an air bag according to the present invention is preferably cylindrical, though the cross-sectional shape in the width direction is not restricted to a circular shape, and may also be conical or polygonal.

The gas inflow space is part of the combustion chamber and is surrounded in three sides by the housing inner wall surface and the ignition means chamber, with the remaining one side communicating with the space inside the combustion chamber occupied by the gas generating agent.

In the gas generator for an air bag according to the present invention, the shockwave of the ignition energy generated by activation of the ignition means enters first into the gas inflow space unoccupied by the gas generating agent, changes its flow direction, and then collides with the gas generating agent. Thereby, the fragmentation, etc. of the gas generating agent is prevented, which allows maintaining the originally designed combustibility.

The combustion chamber of the gas generator for an air bag according to the present invention has a separating wall disposed inside the combustion chamber; herein, the gas inflow space may be surrounded, except a side in one direction, by the separating wall and the ignition means chamber. This is so designed to be adapted to changes in numerous types of the structure of the gas generator.

In the gas generator for an air bag according to the present invention, preferably, the size of a non-surrounded area and the dimension of the gas generating agent are preferably correlated so as to prevent the entry of the gas generating agent into the gas inflow space.

Since the gas inflow space is surrounded by the housing inner wall surface and the ignition means chamber, and communicates at least in one side with the space occupied by the gas generating agent in the combustion chamber, it is desirable that the size of the non-surrounded surface, serving as the communication portion, and/or the dimension of the smallest portion of the gas generating agent be adjusted so that the size of the non-surrounded area is smaller than the dimension of the smallest portion of the gas generating agent (the diameter of the gas generating agent, when it is cylindrical in shape).

In the gas generator for an air bag according to the present invention, preferably the communication hole directly opposes the housing inner wall surface or the separating wall. When they are arranged opposingly as the above, a direction of the ignition energy can be changed, and as a result, a more effective mist capture without hindering the flow of the ignition energy can be obtained.

As another solving means, the present invention provides a gas generator for an air bag comprising, inside a housing having a gas discharge port, an ignition means chamber including an ignition means, a combustion chamber accommodating therein a gas generating agent ignited and burned by the ignition means, and an intermediate chamber formed between the ignition means chamber and the combustion chamber, wherein the ignition means chamber and the intermediate chamber are in communication only by a first communication hole(s), and the intermediate chamber and the combustion chamber are in communication only by a second communication hole(s), an ignition energy generated by an activation of the ignition means inside the ignition means chamber flows into the intermediate chamber via the first communication holes and into the combustion chamber via the second communication holes to cause the gas generating agent to ignite and burn, and the first communication hole and the second communication hole are disposed such that the ignition energy generated in the ignition means chamber flows into the combustion chamber not directly but by making a detour.

The gas generating agent in the gas generator for an air bag according to the present invention is molded into a desired shape, such as a tablet, a cylinder, a pellet, etc. The ignition means may comprise a combination of an igniter and a conventional transfer charge such as $B/KNO_3$ or a conventional gas generating agent (the gas generating agent acts mainly as a transfer charge though its combustion gas may also be used to inflate the air bag).

The housing of the gas generator for an air bag according to the present invention is preferably cylindrical, though the cross-sectional shape in the width direction is not restricted to a circular shape, and may also be conical or polygonal.

In the gas generator for an air bag according to the present invention, the shockwave of the ignition energy generated by the activation of the ignition means flows into the combustion chamber not directly but by making a detour, thus not colliding directly with the gas generating agent, thereby preventing the fragmentation, etc. of the gas generating agent and maintaining the originally designed combustibility.

In the gas generator for an air bag according to the present invention, the opening directions of the first communication hole and second communication hole are preferably different, and more preferably the opening directions of the first communication hole and second communication hole are perpendicular to each other. The first communication holes are arranged in a direction different to, and particularly preferably in a direction perpendicular to, the direction in which the ignition energy advances.

With such a arrangement of the first communication hole and the second communication hole, the direction in which the ignition energy passes through the first and second communication holes is different, so that the ignition energy flows into the combustion chamber not advancing directly but by making a detour, whereby the effect of the present invention can be obtained.

In the gas generator for an air bag according to the present invention, the first communication hole or second communication hole preferably face a housing inner wall surface or an intermediate chamber inner wall surface.

The high-temperature gas (ignition energy) contains in some cases a mist (solid components, e.g., metal components included in the gas generating agent and released by the combustion thereof). If the first or second communication holes are arranged to face the housing inner wall surface or the intermediate chamber inner wall surface, the high-temperature gas collides reliably against the housing inner wall surface, whereby the mist component is captured by adhering to the lower-temperature inner wall surface and solidifies. As a result, an amount of mist component decreases.

In the gas generator for an air bag according to the present invention, preferably, at least one of a first partitioning means for separating the ignition means chamber and the intermediate chamber, and second partitioning means for separating the intermediate chamber and the combustion chamber is preferably movable, so that volumes of the ignition means chamber, the intermediate chamber, and the combustion chamber can be modified by moving at least one of the first and second partitioning means.

Modifying the volume of each chamber allows adjusting charging amounts of the gas generating agent inside the combustion chamber and of the gas generating agent or transfer charge inside the ignition means chamber, thereby affording an easy regulation of the gas generator output.

In the gas generator for an air bag according to the present invention, the first partitioning means for separating the ignition means chamber and the intermediate chamber has preferably a protruding portion; alternatively, the second partitioning means for separating the intermediate chamber and the combustion chamber has preferably a recess portion, wherein the protruding portion or the recess portion abuts against an opposite partitioning means.

An intermediate chamber having a predetermined volume can be easily formed by abutting the protruding portion of the first partitioning means against the flat surface of the second partitioning means, or by abutting the recess portion of the second partitioning means against the flat surface of the first partitioning means, and additionally by abutting both of the protruding portion and the recess portion against the flat surface. Accordingly, a moving passage for the ignition energy from the first communication hole to the second communication hole can be obtained easily. The height of the protruding portion and the depth of the recess portion are set in accordance with a desired volume of the intermediate chamber.

In the gas generator for an air bag according to the present invention, preferably, the cross-section area of the intermediate chamber in the axial direction of the housing is larger than the total opening area of the second communication hole(s).

These relationships allow the ignition energy to flow easily into the combustion chamber, thereby increasing the combustibility of the gas generating agent.

In the gas generator for an air bag according to the present invention, preferably, an igniter and a first gas generating agent (as explained above, mainly serving as a transfer charge) are accommodated inside the ignition means chamber, while a second gas generating agent is accommodated in the combustion chamber, such that a combustion temperature of the first gas generating agent is higher than a combustion temperature of the second gas generating agent.

A gas generating agent having a combustion temperature of 1700 to 3000° C. may be used as the first gas generating agent, with for instance a composition comprising nitroguanidine as fuel, strontium nitrate as an oxidizer, etc.

A gas generating agent having a combustion temperature of 1000 to 1700° C. may be used as the second gas generating agent, with for instance a composition comprising guanidine nitrate as fuel, a basic copper oxide as an oxidizer, etc.

Among the first and second gas generating agents, the first gas generating agent has a better ignitability and a higher combustion temperature, and generates a larger ignition energy. Thus, even when the ignition energy generated by the combustion of the first gas generating agent flows into the combustion chamber by making a detour, the ignitability of the second gas generating agent is not lowered in comparison with the case in which the ignition energy directly flows, by not making a detour, into the combustion chamber.

The gas generator for an air bag according to the present invention may be applicable to both a pyrotechnic inflator in which only a high-temperature combustion gas is used as an air bag inflating means and a hybrid inflator in which a high-temperature combustion gas and a pressurized gas such as helium, argon, nitrogen, etc. are used.

The gas generator for an air bag according to the present invention may also be suitably used as both of a single-type gas generator, comprising only a single set of an ignition means and a combustion chamber, or a dual type gas generator comprising two sets of an ignition means and a combustion chamber.

The gas generator for an air bag according to the present invention may be applicable to conventional gas generators for an air bag, such as an air bag inflator for a driver side, an air bag inflator for a front passenger side, a side air bag inflator, a curtain inflator, etc.

According to the gas generator for an air bag of the present invention, the shockwave of the ignition energy generated by the activation of the igniter does not collide directly against the gas generating agent in the combustion chamber; as a result, the gas generating agent does not break nor is damaged. Thus, the gas generating agent can preserve its originally designed combustibility, which increases the reliability of the product.

DETAILED DESCRIPTION OF THE INVENTION (1) First Embodiment

Figure 1:
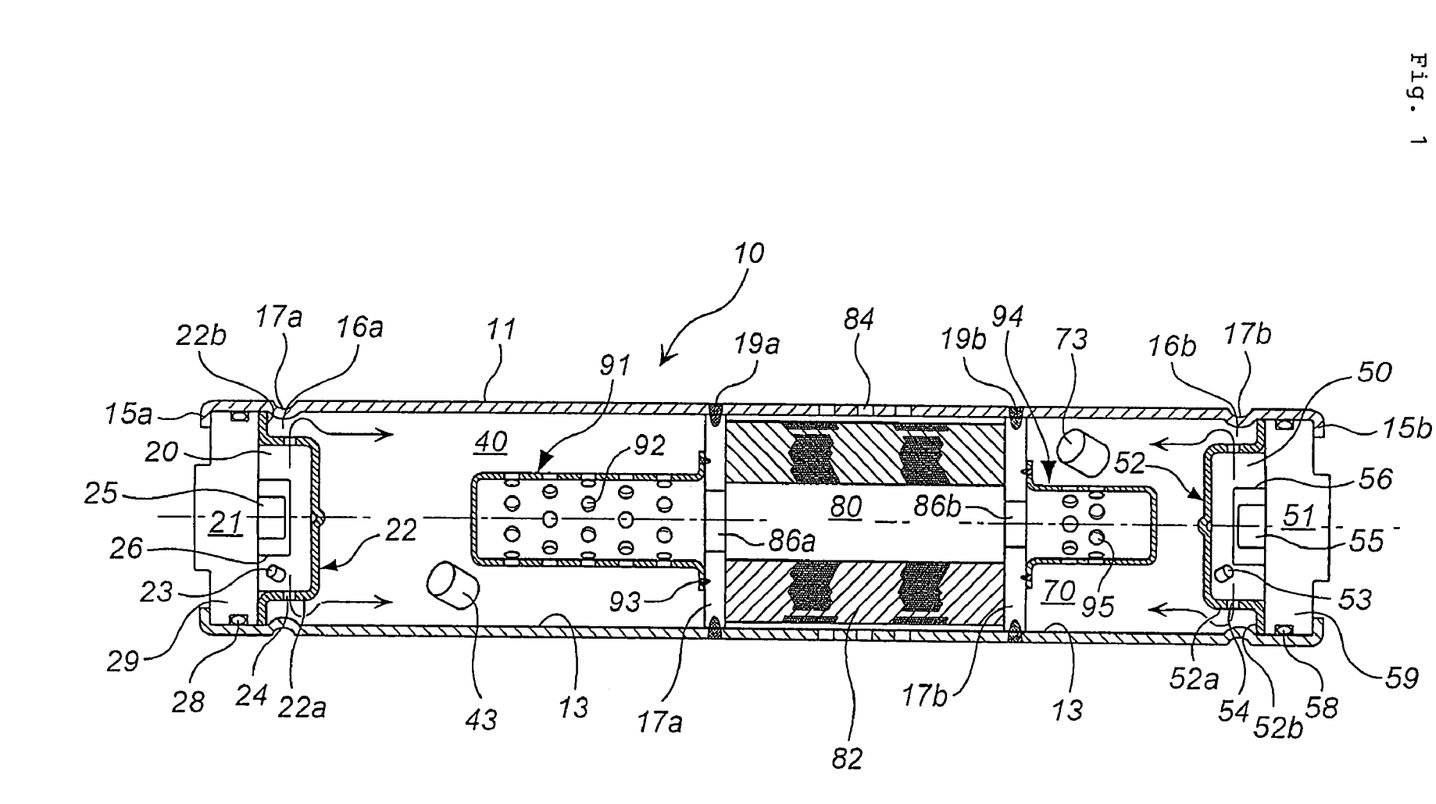
FIG. 1 is an axial cross-sectional view of a gas generator for an air bag.
Figure 2:
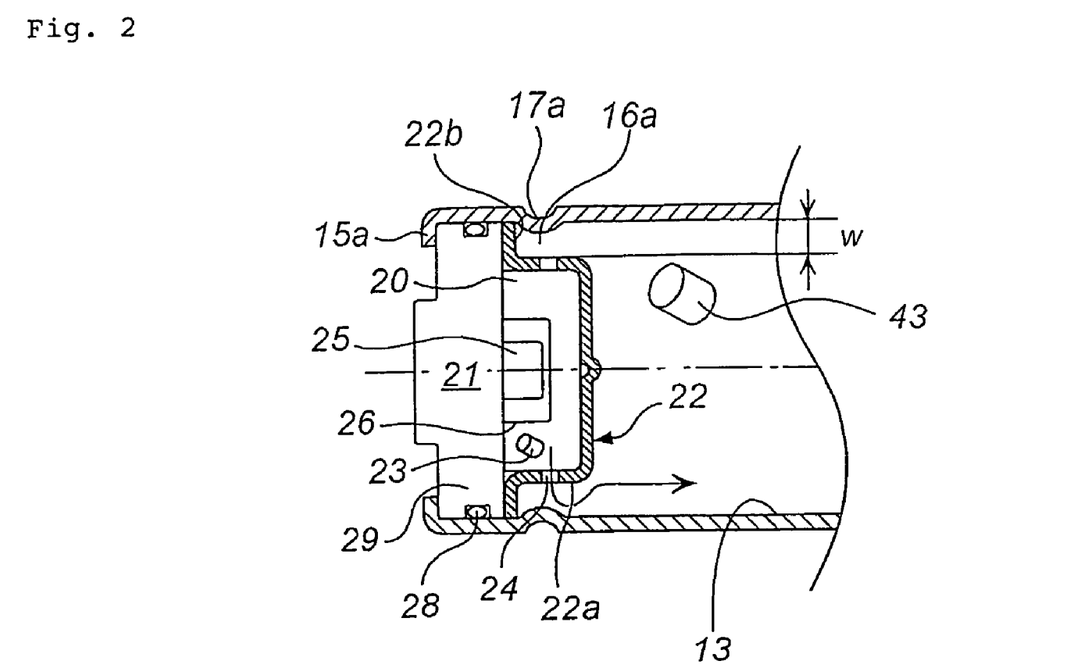
FIG. 2 is a partial cross-sectional view of FIG. 1.

A first embodiment will be described below with reference to FIG. 1 and FIG. 2. FIG. 1 is an axial cross-sectional view of a gas generator, and FIG. 2 is a partial cross-sectional view of FIG. 1. The gas generator 10 of FIG. 1 is a dual-type pyrotechnic inflator.

In one end of a cylindrical housing 11, there are provided a first ignition means chamber 20 and a first combustion chamber 40, adjacent to each other in the axial direction of the housing.

The first ignition means chamber 20 is enclosed by a first ignition means chamber housing 22 serving as a partitioning means, and accommodates therein a first igniter 21. The first igniter 21 is fixed together with a collar 29 by crimping an end portion periphery 15a of the cylindrical housing 11. Reference numeral 28 denotes an O-ring 28 for securing moisture-proof.

The first ignition means chamber housing 22 is fixed by an annular crimped portion 17a of the cylindrical housing 11 and the first igniter 21, so that it cannot move in the axial direction of the housing 11. If the annular crimped portion 17a is not provided, the first ignition means chamber housing 22 can be press-inserted into the cylindrical housing 11 to be moved optionally in the axial direction of the housing.

The first ignition means chamber 20 accommodates therein a first gas generating agent 23 having a combustion temperature of 1700 to 3000° C. The ignition portion 25 of the first igniter 21 is covered by an aluminum cup 26 so that the ignition portion 25 and the first gas generating agent 23 are not in contact with each other.

The first combustion chamber 40 is enclosed by the first ignition means chamber housing 22, the cylindrical housing 11 and a first partition wall 18a. The first combustion chamber 40 accommodates therein a second gas generating agent 43 having a combustion temperature of 1000 to 1700° C.

In part of the first combustion chamber 40, an annular gas inflow space 16a is defined, being surround by a housing inner wall surface 13 (crimped portion 17a), the outer peripheral surface 22a of the ignition means chamber housing 22, and a flange portion 22b. And only one side of the annular gas inflow space 16a communicates with a space where the second gas generating agent 43 inside the first combustion chamber 40 exists (a space where the gas generating agent exists).

As shown in FIG. 2 dimension of the width W of the communicating portion (the non-surrounded portion of the annular gas inflow space 16a) between the gas inflow space 16a and the space where the gas generating agent exists is set to be smaller than a diameter of the cylindrical second gas generating agent 43, which prevents the second gas generating agent 43 from entering the gas inflow space 16a. As a result, the charging operability of the gas generating agent does not become impaired.

The first ignition means chamber 20 and the first combustion chamber 40 are only communicated through a plurality of first communication holes 24. The plurality of first communication holes 24 faces the gas inflow space 16a and faces directly the inner wall surface 13 of the cylindrical housing 11.

Due to the position of the first communication hole 24 and presence of the gas inflow space 16a and the inner wall surface 13, the ignition energy, generated by the activation of the first igniter 21 in the first ignition means chamber 20, passes through the first communication hole 24, flows in the first gas inflow space 16a, strikes against the inner wall surface 13 of the housing to change its direction and then ignites and burns the second gas generating agent 43 in the first combustion chamber 40.

In the other end of the cylindrical housing 11 there are provided a second ignition means chamber 50 and a second combustion chamber 70, adjacent to each other in the axial direction of the housing.

The second ignition means chamber 50 is surrounded by a second ignition means chamber housing 52 as a partitioning means, and accommodates therein a second igniter 51. The second igniter 51 is fixed together with a collar 59 by crimping an end portion periphery 15b of the cylindrical housing 11. Reference numeral 58 denotes an O-ring for securing moisture-proof.

The second ignition means chamber housing 52 is fixed by an annular crimped portion 17b of the cylindrical housing 11 and the second igniter 51, so that it cannot move in the axial direction of the housing 11. If the annular crimped portion 17b is not provided, the second ignition means chamber housing 52 can be press-inserted into the cylindrical housing 11 to be moved optionally in the axial direction of the housing.

The second ignition means chamber 50 accommodates therein a first gas generating agent 53 having a combustion temperature of 1700 to 3000° C. The igniting portion 55 of the second igniter 51 is covered by an aluminum cup 56 so that the ignition portion 55 and the first gas generating agent 53 are not in contact with each other.

The second combustion chamber 70 is surrounded by a second ignition means chamber housing 52, the cylindrical housing 11 and a second partition wall 18b. The second combustion chamber 70 accommodates therein a second gas generating agent 73 having a combustion temperature of 1000 to 1700° C.

In part of the second combustion chamber 70, an annular gas inflow space 16b is defined, being surround by a housing inner wall surface 13 (crimped portion 17b), the peripheral surface 52a of the ignition means chamber housing 52, and a flange portion 52b. And only one side of the annular gas inflow space 16b communicates with a space where the second gas generating agent 73 inside the second combustion chamber 70 exists (a space where the gas generating agent exists).

The dimension of the width (which is the same as W in FIG. 2) of the communicating portion (the non-surrounded side of the annular gas inflow space 16b) between the gas inflow space 16b and the second combustion chamber 70 where the gas generating agent exists is set to be smaller than a diameter of the cylindrical second. gas generating agent 73, which prevents the second gas generating agent 73 from entering the gas inflow space 16b. As a result, the charging operability of the gas generating agent does not become impaired.

The second ignition means chamber 50 and the first combustion chamber 70 are only communicated through a plurality of second communication holes 54. The plurality of second communication holes 54 faces the gas inflow space 16b and faces directly the inner wall surface 13 of the cylindrical housing 11.

Due to the position of the first communication hole 54 and presence of the gas inflow space 16b and the inner wall surface 13, the ignition energy, generated by the activation of the first igniter 51 in the first ignition means chamber 50, passes through the first communication hole 54, flows in the first gas inflow space 16b, strikes against the inner wall surface 13 of the housing to change its direction and then ignites and burns the second gas generating agent 73 in the first combustion chamber 70.

In the central portion of the cylindrical housing 11, there is provided a filter chamber 80 sandwiched between a first partition wall 18a and a second partition wall 18b. The first partition wall 18a and the second partition wall 17b are welded and fixed to the cylindrical housing 11 at welding portions 19a and 19b.

A third communication hole 86a is provided in the first partition wall 18a; this third communication hole 86a is covered, from the first combustion chamber 40 side, by a cap 91 having a plurality of vent holes 92. The cap 91 is provided to prevent the second gas generating agent 43 from getting into the third communication hole 86a thereby blocking it. The cap 91 is fixed to the first partition wall 18a by welding a flange 93.

A fourth communication hole 86b is provided in the first partition wall 18a; this fourth communication hole 86b is covered, from the second combustion chamber 70 side, by a cap 94 having a plurality of vent holes 95. The cap 94 is provided to prevent the second gas generating agent 73 from getting into the fourth communication hole 86b thereby blocking it. The cap 94 is fixed to the first partition wall 18b by welding a flange portion 96.

In the filter chamber 80, is provided a cylindrical filter 82, and a space is provided between the outer surface thereof and the inner wall surface 13 of the cylindrical housing 11. In the wall surface of the cylindrical housing 11, opposing the cylindrical filter 82, there is provided a plurality of gas discharge ports 84. The plurality of gas discharge ports 84 is closed by a seal tape made of aluminum etc. as a moisture-proof measure.

The operation of the gas generator 10, when incorporated in an automobile air bag system, is described next with reference to FIGS. 1 and 2. Below is also explained the case when there is a slight time lag between the activations of the first igniter 21 and the second igniter 51.

The first igniter 21 is activated upon a vehicle collision, causing the first gas generating agent 23 to ignite and burn. Since the first gas generating agent 23 has a combustion temperature of 1700 to 3000° C., it has an excellent ignitability that affords a large ignition energy.

The ignition energy (high-temperature gas and flame) generated by this combustion is jetted from the first communication holes 24, in the diametrical direction of the housing, into the gas inflow space 16a, where it hits against the inner wall 13 of the cylindrical housing. A mist is captured then by adhering and solidifying to the inner wall 13, which weakens slightly the intensity of the ignition energy impact.

The flow of ignition energy colliding against the inner wall 13 of the cylindrical housing, after making a 90° turn, comes into contact with the second gas generating agent 43 of the first combustion chamber 40, triggering its ignition and combustion.

The ignition energy, generated thus by the combustion of the first gas generating agent 23, comes into contact with the second gas generating agent 43 of the first combustion chamber 40 not directly but by making a detour, which decreases the likelihood of damages such as fragmentation, etc. of the second gas generating agent 43, caused by the shockwave of the ignition energy.

The combustion temperature of the second gas generating agent 43 ranges from 1000 to 1700° C., which intrinsically corresponds to a low ignitability; however, its effective ignitability is excellent thanks to the large ignition energy released by the combustion of the first gas generating agent 23, which has a high combustion temperature. Thus, ignitability does not decrease by the roundabout flow of the ignition energy as it comes into contact with the second gas generating agent 43 in the first combustion chamber 40.

The high-temperature gas released in the combustion of the second gas generating agent 43 passes though the vent holes 92 and into the cap 91, and flows into the filter chamber 80 though the third communication hole 86a. The gas is cooled then by passing through the cylindrical filter 82, where combustion residues are filtered; the gas is then discharged out of the gas discharge ports 84, by bursting the seal tape, in order to inflate the air bag.

If the second igniter 51 is activated after a time lag, an identical action causes high-temperature gas to be discharged through the gas discharge ports 84, further inflating the air bag.

(2) Second Embodiment

Figure 3:
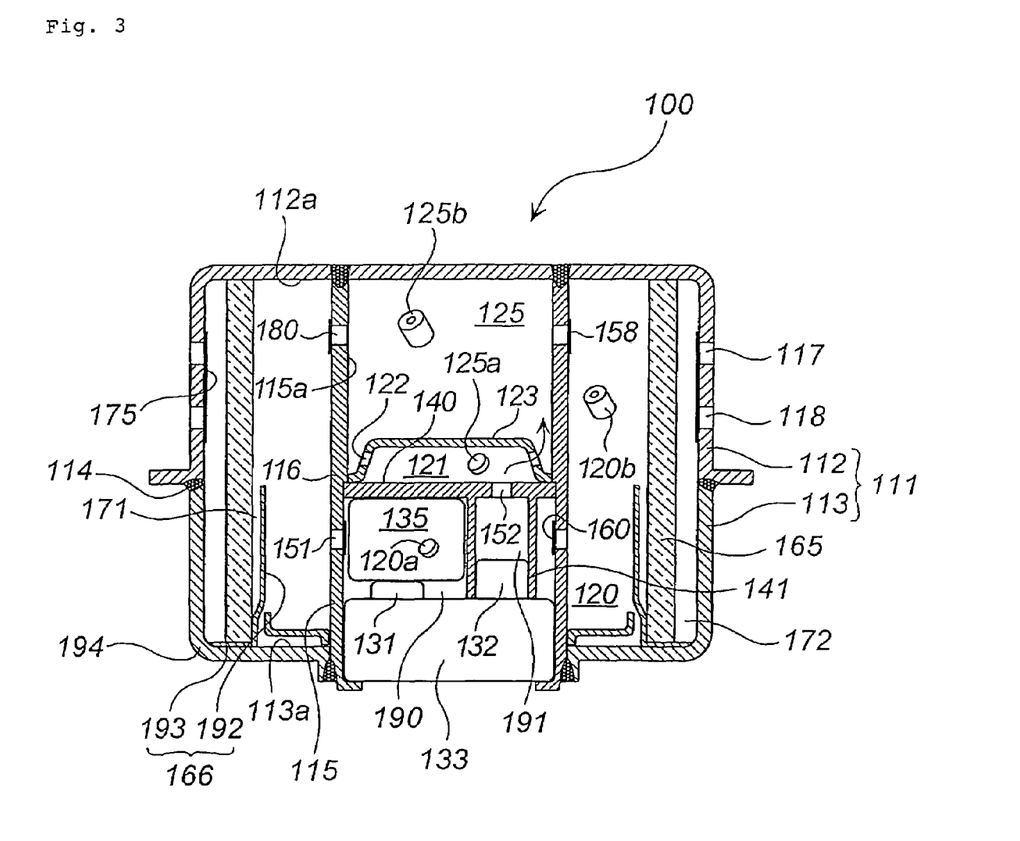
FIG. 3 is an axial cross-sectional view of another embodiment of a gas generator for an air bag.
Figure 4:
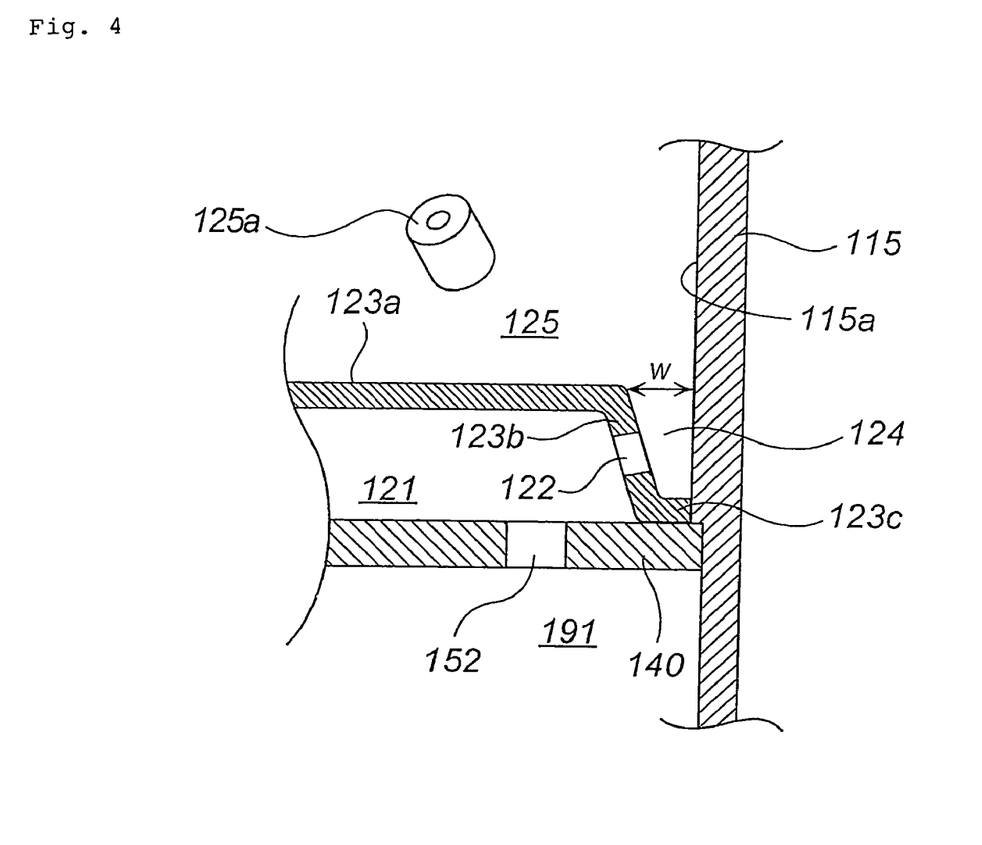
FIG. 4 is a partial cross-sectional view of FIG. 3.

Another embodiment is explained next with reference to FIG. 3 and FIG. 4. FIG. 3 is an axial cross-sectional view of a disk-shaped gas generator, and FIG. 4 is a partial cross-sectional view of FIG. 3. In this embodiment, the effect of the present invention is achieved only in the second combustion chamber.

An outer shell container of a gas generator 100 is constituted by a housing 111 formed by joining a diffuser shell 112 and a closure shell 113 which forms an internal storage space together with the diffuser shell 112. The diffuser shell 112 and the closure shell 113 are welded at a welding portion 114. Another black-shaded parts of FIG. 3 indicate other welding portions.

Gas discharge ports 117, 118 are provided in the circumferential direction of the diffuser shell 112 in a required number, and these gas discharge ports 117, 118 are closed by an aluminum seal tape 175. The gas discharge ports 117 and 118 may have identical or different diameters.

An inner cylinder 115 having a substantially cylindrical form is disposed inside the housing 111. The upper-end peripheral edge of the inner cylinder 115 is joined to a ceiling surface 112a of the diffuser 112, and the lower end peripheral edge thereof is joined to a base surface 113a of the closure shell 113. Thus, a first combustion chamber 120 which accommodates a first gas generating agent 120b is formed in the space inside the housing and outside the inner cylinder 115. A single collar 133, to which a first igniter 131 and a second igniter 132 are fixed, is provided in the lower side opening of the open inner cylinder 115, to close the interior of the inner cylinder 115.

A partition wall 140 is provided in the inner cylinder 115 for dividing the space in the interior of the inner cylinder 115 into upper and lower sections. The partition wall 140 is formed in a flat circular form comprising a skirt portion 141, which surrounds the periphery of the second igniter 132, and a first through hole 152 formed within the part of the partition wall 140 that is surrounded by the skirt portion 141; the partition wall 140 is fitted, from the lower side, into a stepped notch portion 116 of the inner cylinder 115.

The fitting of the partition wall 140 into the stepped notch portion 116 of the inner cylinder 115 prevents the pressure generated upon activation of the first igniter 131 from traveling upwards. Moreover, since the inner diameter of the skirt portion 141 is set to be substantially identical to the outer diameter of the ignition part of the igniter 132, such that the skirt portion 141 surrounds the ignition part in an airtight fashion, the flame that is generated by an activation of the second igniter 132 advances directly only in the direction of the first communication hole 152.

The first igniter 131 and a first gas generating agent 120a charged into an aluminum cup 135 are disposed in a first ignition means chamber 190 which is a space defined outside the skirt portion 141 but inside the lower space partitioned by the partition wall 140 in the inner cylinder 115 (i.e. the space closed by the collar 133). The first combustion chamber 120 communicates with the first ignition means chamber 190 through a first through hole 151.

A space occupied by the second igniter 132 inside the skirt portion 141 is a first space 191, and a space surrounded by the partition wall 140 and a retainer 123 is a second space 121; the first space 191 and the second space 121 form a second ignition means chamber. The second space 121 accommodates therein a second gas generating agent 125a.

By disposing the partition wall 140 having the skirt portion 141 in the inner cylinder 115, a second combustion chamber 125 is separated from the two igniters, and the first igniter 131 is separated from the second igniter 132. Thus, the combustion energy released by the activation of the first igniter 131 flows into the first combustion chamber 120 but is prevented from entering the first space 191.

The gas generating agent 120a charged in the aluminum cup 135 is positioned directly above the first igniter 131, and the first through hole 151 provided in a lower portion of a side wall of the inner cylinder 115 is positioned substantially directly opposing the axial center of the aluminum cup 135, in a position that does not directly face the direction of advancement of the flame generated by an activation of the first igniter 131. An aluminum or stainless steel seal tape 160 is adhered to the first through hole 151 from the inside.

Further, the first through hole 151 is provided in the lower portion of the inner cylinder 115, and a shielding plate 166 is provided outside the first combustion chamber 120, at a position directly facing the first through hole 151 inside a cylindrical filter 165 which is provided to face the peripheral wall surface of the housing.

The shielding plate 166 comprises a tube portion 192 and an outward flange-shaped circular portion 193 formed integrally with one side (the lower side in FIG. 3) of the tube portion 192; the shielding plate 166 is formed such that the circular portion 193 abuts against the base surface 113a and the tube portion 192 covers a predetermined range of the lower portion of the cylindrical filter 165 (a height range of approximately ½ to ⅔ of the entire height of the cylindrical filter 165).

The shielding plate 166 may be positioned in relation to the housing by making the outer peripheral edge portion of the circular portion 193 abut against a curved portion 194 of the housing. Filter positioning during assembly may be performed by making the inner peripheral surface of the filter 165 abut against the lower-side outer peripheral surface of the tube portion 192. The tube portion 192 is disposed to secure an annular gap 171 between the tube portion 192 and the inner peripheral surface of the filter 165.

The space enclosed by the cylinder 115 and the retainer 123 that is provided on the partition wall 140 forms a second combustion chamber 125. In the second combustion chamber 125, is charged a second gas generating agent 125b. The second gas generating agent 125a and the second gas generating agent 125b have the same combustion temperature relationship as in the first embodiment.

In part of the second combustion chamber 125, an annular gas inflow space 124 is defined, being surrounded by the inner wall surface 115a of the inner cylinder 115 (partition wall), a peripheral surface 123b and a flange portion 123c of the retainer 123. And only one side of the annular gas inflow space 124 communicates with a space where the second gas generating agent 125b inside the second combustion chamber 125 exists. As shown in FIG. 4, when a width of the gas inflow space 124 is largest at a communication portion between the space occupied by the second gas generating agent 125 and the gas inflow space 124, it can desirably afford a better gas flow. However, such width may also be made uniform, as in the case of FIG. 1.

The dimension of the width W of the communicating section between the second combustion chamber 125 occupied by the second gas generating agent 125b and the gas inflow space 124 is set to be smaller than the diameter of the cylindrical second gas generating agent 125b, which prevents the second gas generating agent 125b from entering the gas inflow space 124. As a result, the charging operability of the gas generating agent does not become impaired.

The second space 121 and the second combustion chamber 125 are only in communication with each other through a plurality of second communication holes 122. The plurality of second communication holes 122 faces the gas inflow space 124 and faces directly the inner wall surface 115a.

The volumes of the second space 121 and the second combustion chamber 125 may be adjusted by moving the retainer 123 optionally in the axial direction of the housing. Alternatively, the retainer 123 may be fixed, but another movable retainer having a plurality of vent holes may be disposed inside the second combustion chamber 125 to adjust the volume of the second combustion chamber 125.

In the gas generator 100 according to the present embodiment, the activation of the second igniter 132 inside the first space 191 causes the ignition and combustion of the second gas generating agent 125a, thus filling with ignition energy the first space 191 and the second space 121.

The ignition energy flows from the second communication holes 122 into the gas inflow space 124, and collides with the inner wall surface 115a. A mist is captured by adhering and solidifying to the inner wall 115a, which weakens slightly the intensity of the ignition energy impact.

The flow of ignition energy colliding against the inner wall 115a of the cylindrical housing, after making a 90° turn, comes into contact with the second gas generating agent 125b in the second combustion chamber 125, triggering its ignition and combustion.

The ignition energy generated thus by the combustion of the second gas generating agent 125a comes into contact with the second gas generating agent 125b inside the second combustion chamber 125, not directly but by making a detour, which decreases the likelihood of damage such as breaking of the second gas generating agent 125b caused by the shockwave of the ignition energy.

The high-temperature gas generated in the second combustion chamber 125 bursts the seal tape 158 and flows into the first combustion chamber 120 via the second through holes 180, passes then through the filter 165 and a space 172 defined between the filter 165 and the housing 111, and is discharged through the gas discharge ports 117, 118, thus further inflating the air bag.

(3) Third Embodiment

Figure 5:
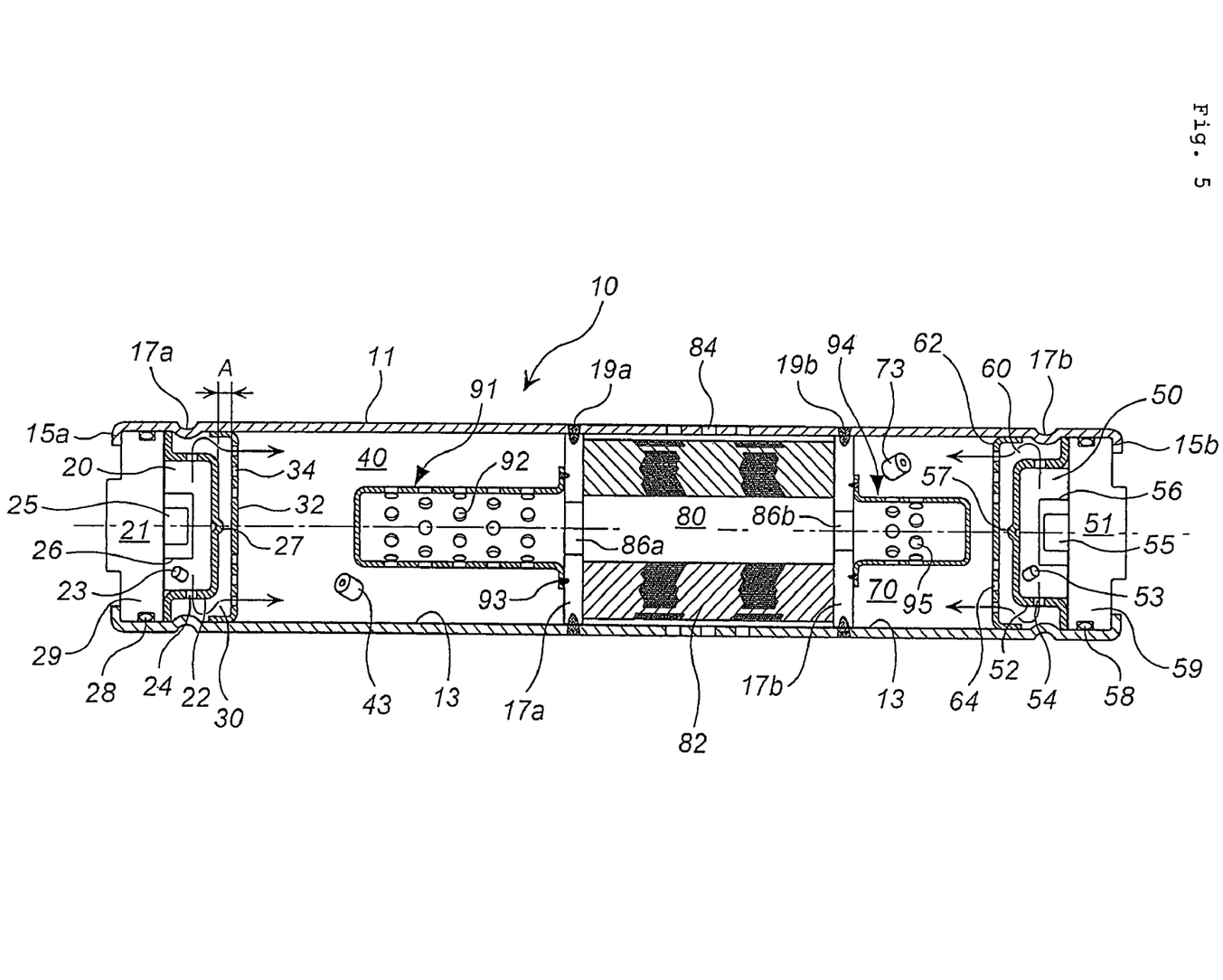
FIG. 5 is an axial cross-sectional view of another embodiment of a gas generator for an air bag.

A third embodiment will be described below with reference to FIG. 5. FIG. 5 is an axial cross-sectional view of a gas generator. The gas generator of FIG. 5 is a dual-type pyrotechnic inflator.

In one end of a cylindrical housing 11, there are provided a first ignition means chamber 20, a first intermediate chamber 30 and a first combustion chamber 40.

The first ignition means chamber 20 is enclosed by a first ignition means chamber housing 22 serving as a partitioning means, and accommodates therein a first igniter 21. The first igniter 21 is fixed together with a collar 29 by crimping an end portion periphery 15a of the cylindrical housing 11. The numeral 28 denotes an O-ring 28 for securing moisture-proof.

The first ignition means chamber housing 22 is fixed by an annular crimped portion 17a of the cylindrical housing 11 and the first igniter 21, so that it cannot move in the axial direction of the housing 11.

The first ignition means chamber 20 accommodates therein a first gas generating agent 23 having a combustion temperature of 1700 to 3000° C. The ignition portion 25 of the first igniter 21 is covered by an aluminum cup 26 so that the ignition portion 25 and the first gas generating agent 23 are not in contact with each other.

The first intermediate chamber 30 is surrounded by a first retainer 32, the cylindrical housing 11 and a first ignition means chamber housing 22.

The first retainer 32 is fitted to be capable of moving in the axial direction of the cylindrical housing 11, such that the movement of the first retainer 32 in the axial direction of the housing allows adjusting the volumes of the first intermediate chamber 30 and of the first combustion chamber 40.

A protruding portion 27 is provided at the top of the first ignition means chamber housing 22, so that even if the first retainer 32 moves towards the first ignition means chamber 20 acted upon by an external force, it is stopped at the position where the top surface of the first retainer 32 hits against the protruding portion 27. Thereby, such a risk is eliminated that the first intermediate chamber 30 disappears and the flow of the ignition energy is blocked.

The first combustion chamber 40 is surrounded by the first retainer 32, the cylindrical housing 11 and a first partition wall 18a. The first combustion chamber 40 accommodates therein a second gas generating agent 43 having a combustion temperature of 1000 to 1700° C.

The first ignition means chamber 20 and the first intermediate chamber 30 are in communication through a plurality of first communication holes 24 provided in the peripheral wall of the first ignition means chamber housing 22. The first communication holes 24 are directly opposite to the inner wall surface 13 of the cylindrical housing 11.

The first intermediate chamber 30 and the first combustion chamber 40 are in communication through a plurality of second communication holes 34 provided in the top surface (flat side) of the first retainer 32. The second communication holes 34 do not directly face the inner wall surface 13 of the cylindrical housing 11.

Part or all of the second communication holes 34 may also be provided in the vicinity of the central portion of the top surface of the first retainer 32 (around a position directly facing the protruding portion 27). By providing these holes in the central portion of the top surface, the circumventing distance of the ignition energy increases, further buffering its impact.

The first communication holes 24 and the second communication holes 34 are thus arranged such that the directions of their openings are perpendicular to each other. Moreover, the cross-section area of the first intermediate chamber 30 in the axial direction of the housing (the axial cross-section area of the portion shown as A in the drawing) is larger than the total opening area of the second communication holes 34.

In the other end of the cylindrical housing 11, there are provided a second ignition means chamber 50, a second intermediate chamber 60, and a second combustion chamber 70.

The second ignition means chamber 50 is surrounded by a second ignition means chamber housing 52 as a partitioning means, and accommodates therein a second igniter 51. The second igniter 51 is fixed together with a collar 59 by crimping an end portion periphery 15b of the cylindrical housing 11. The numeral 58 denotes an O-ring for securing moisture-proof.

The second ignition means chamber housing 52 is fixed by an annular crimped portion 17b of the cylindrical housing 11 and the second igniter 51, so that it cannot move in the axial direction of the housing 11.

The second ignition means chamber 50 accommodates therein a first gas generating agent 53 having a combustion temperature of 1700 to 3000° C. The igniting portion 55 of the second igniter 51 is covered by an aluminum cup 56 so that the ignition portion 55 and the first gas generating agent 53 are not in contact with each other.

The second intermediate chamber 60 is surrounded by a second retainer 62, the cylindrical housing 11 and a second ignition means chamber housing 52.

The second retainer 62 is fitted to be capable of moving in the axial direction of the cylindrical housing 11, such that the movement of the second retainer 62 in the axial direction of the housing allows adjusting the volumes of the second intermediate chamber 60 and of the second combustion chamber 70.

A protruding portion 57 is provided at the top of the second ignition means chamber housing 52, so that even if the second retainer 62 moves towards the second ignition means chamber 50 acted upon by an external force, it is stopped at the position where the top surface of the second retainer 62 hits against the protruding portion 57. Thereby, such a risk is eliminated that the second intermediate chamber 60 disappears and the flow of the ignition energy is blocked.

The second combustion chamber 70 is surrounded by the second retainer 62, the cylindrical housing 11 and a second partition wall 18b. The second combustion chamber 70 accommodates therein a second gas generating agent 73 having a combustion temperature of 1000 to 1700° C.

The second ignition means chamber 50 and the second intermediate chamber 60 are in communication through a plurality of second communication holes 54 provided in the peripheral wall of the second ignition means chamber housing 52. The second communication holes 54 are directly opposite to the inner wall surface 13 of the cylindrical housing 11.

The second intermediate chamber 60 and the second combustion chamber 70 are in communication through a plurality of second communication holes 64 provided in the top surface (flat side) of the second retainer 62. The second communication holes 64 do not directly face the inner wall surface 13 of the cylindrical housing 11.

The first communication holes 54 and the second communication holes 64 are thus arranged so that the directions of their openings are perpendicular to each other. Moreover, the cross-section area of the second intermediate chamber 60 in the axial direction of the housing is larger than the total opening area of the second communication holes 64.

In the central portion of the cylindrical housing 11, there is provided a filter chamber 80 sandwiched between a first partition wall 18a and a second partition wall 18b. The first partition wall 18a and the second partition wall 18b are welded and fixed to the cylindrical housing 11 by welding portions 19a, 19b.

A third communication hole 86a is provided in the first partition wall 18a; this third communication hole 86a is covered, from the first combustion chamber 40, by a cap 91 having a plurality of vent holes 92. The cap 91 is provided to prevent the second gas generating agent 43 from getting into the third communication hole 86a thereby blocking it. The cap 91 is fixed to the first partition wall 18a by welding a flange portion 93.

A fourth communication hole 86b is provided in the first partition wall 18b; this fourth communication hole 86b is covered, from the second combustion chamber 70, by a cap 94 having a plurality of vent holes 95. The cap 94 is provided to prevent the second gas generating agent 73 from getting into the fourth communication hole 86b thereby blocking it. The cap 94 is fixed to the first partition wall 18b by welding a flange portion 96.

In the filter chamber 80, is provided a cylindrical filter 82, and a gap is provided between the outer surface of the cylindrical filter 82 and the inner wall surface 13 of the cylindrical housing 11. In the wall surface of the cylindrical housing 11 opposing the cylindrical filter 82, there is provided a plurality of gas discharge ports 84. As a moisture-proof measure, the plurality of gas discharge ports 84 are closed by a seal tape made of aluminum etc.

The operation of the gas generator 10, when incorporated in an automobile air bag system, is described next with reference to FIG. 5. Below is also explained the case when there is a slight time lag between the activations of the first igniter 21 and the second igniter 51.

The first igniter 21 is activated upon vehicle collision, causing the first gas generating agent 23 to ignite and burn. The first gas generating agent 23, which has a combustion temperature of 1700 to 3000° C., has an excellent ignitability that affords a large ignition energy. The ignition energy (high-temperature gas and flame) generated by this combustion is jetted from the first communication holes 24 in the diametrical direction of the housing, into the first intermediate chamber 30. At this time, combustion energy hits against the inner wall 13 of the cylindrical housing, and a mist is captured by adhering and solidifying to the inner wall 13.

The ignition energy flowing into the first intermediate chamber 30 changes its course and is then jetted from the second communication holes 34 into the first combustion chamber 40, where it triggers the ignition and combustion of the second gas generating agent 43.

The ignition energy thus generated by the combustion of the first gas generating agent 23 enters the first combustion chamber 40, not directly but by making a detour, which decreases the likelihood of damage such as fragmentation, etc., of the second gas generating agent 43, caused by the shockwave of the ignition energy.

The combustion temperature of the second gas generating agent 43 ranges from 1000 to 1700° C., which intrinsically corresponds to a low ignitability; however, its effective ignitability is excellent thanks to the large ignition energy released by the combustion of the first gas generating agent 23 which has a high combustion temperature. Thus, ignitability does not decrease by the roundabout flow of the ignition energy to enter in the first combustion chamber 40.

The high-temperature gas released in the combustion of the second gas generating agent 43 passes through the vent holes 92 and into the cap 91, and flows into the filter chamber 80 though the third communication hole 86a. The gas is cooled then by passing through the cylindrical filter 82, where combustion residues are filtered; the gas is then discharged out of the gas discharge ports 84, by bursting the seal tape, in order to inflate the air bag.

When the second igniter 51 is operated after a time lag, an identical action causes high-temperature gas to be discharged through the gas discharge ports 84, further inflating the air bag.

(4) Fourth to Sixth Embodiments

Figure 6:
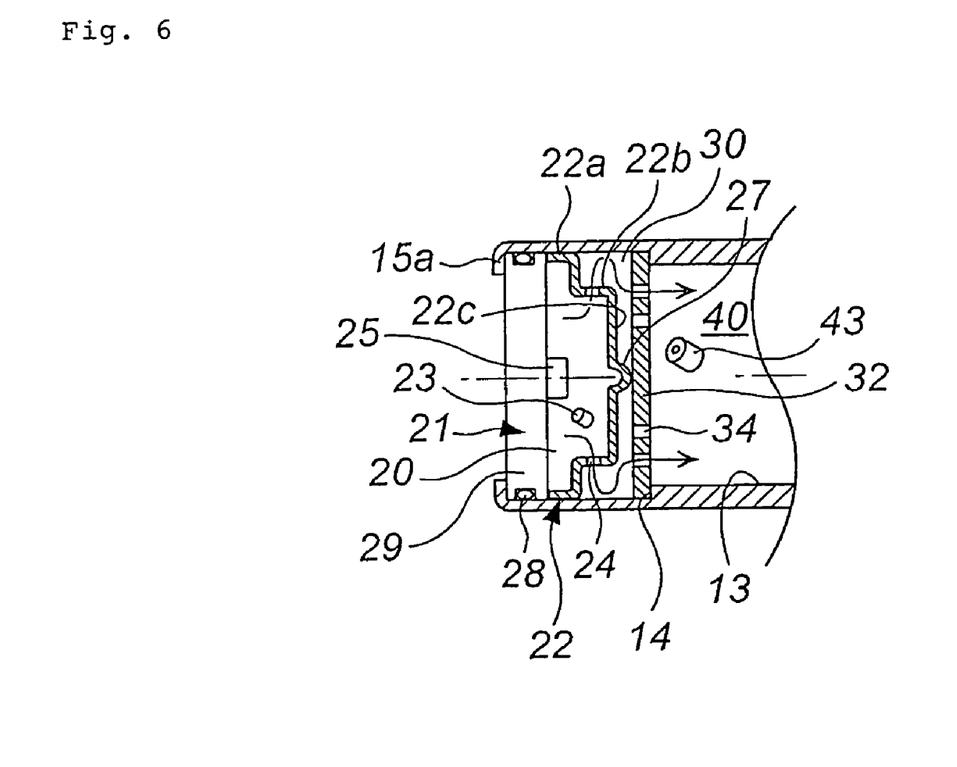
FIG. 6 is a partial axial cross-sectional view of the embodiment of a gas generator for an air bag of FIG. 5, partially modified.
Figure 7:
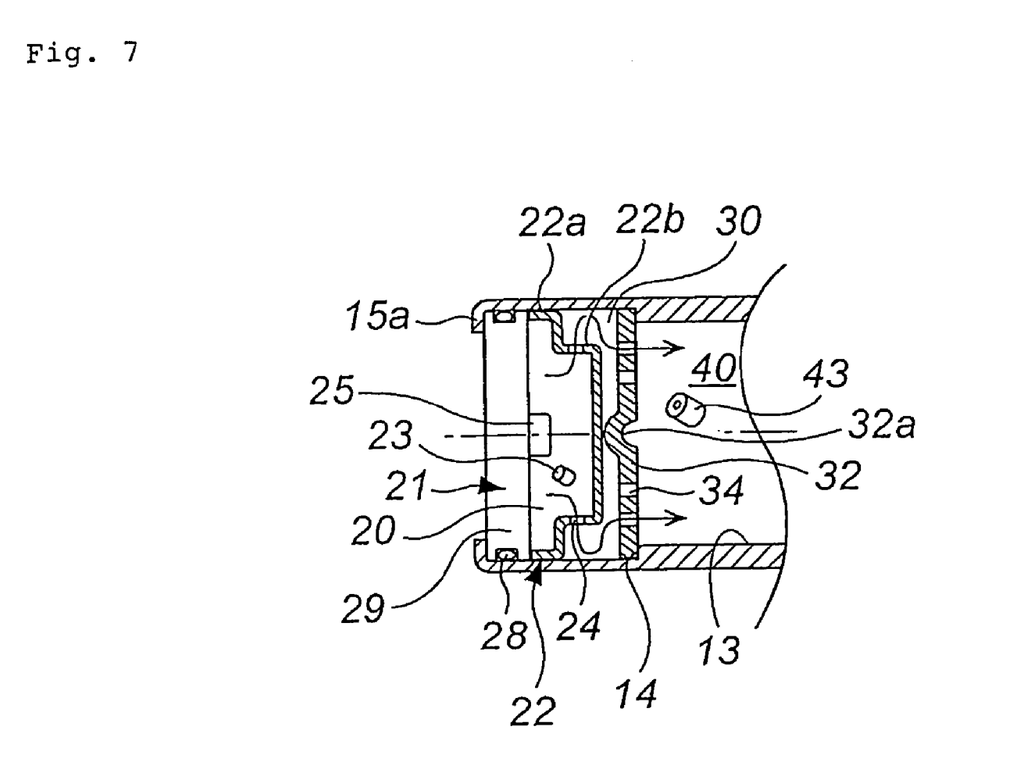
FIG. 7 is a partial axial cross-sectional view of the embodiment of a gas generator for an air bag of FIG. 5, partially modified.
Figure 8:
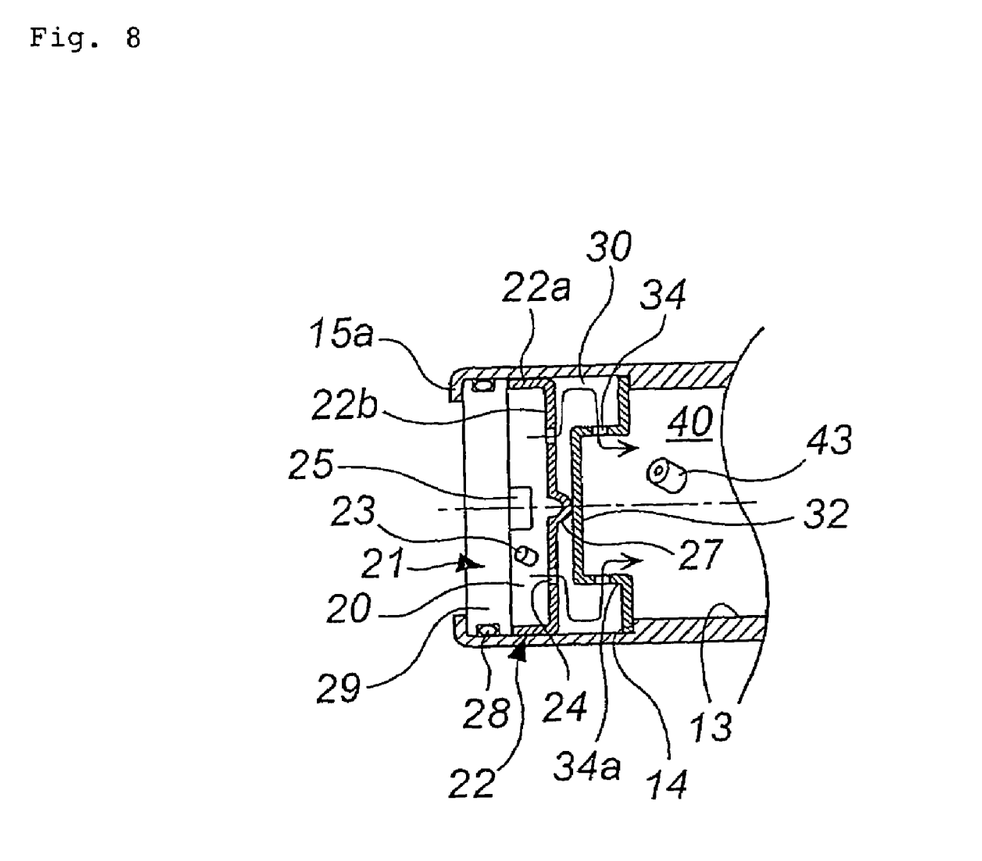
FIG. 8 is a partial axial cross-sectional view of the embodiment of a gas generator for an air bag of FIG. 5, partially modified.

Another embodiments of the present invention are described with reference to FIGS. 6 to 8. FIGS. 6 to 8 are partial cross-sectional view of differing embodiments of the gas generator 10 of FIG. 5. The basic structure of them all is identical to that of FIG. 5, with differences only as regards the structure and the configuration of the first ignition means chamber, the intermediate chamber, and the combustion chamber. In all cases, only the structures in one end will be described since the other end is identical, like the embodiment of FIG. 5.

Gas Generator of FIG. 6

A first ignition means chamber 20 is surrounded by a first ignition means chamber housing 22 as a partitioning means, and a cylindrical housing 11, and accommodates therein a first igniter 21. The first igniter 21 is fixed together with a collar 29 by crimping an end portion peripheral edge 15a of the cylindrical housing 11. Reference numeral 28 denotes an O-ring 28 for securing moisture-proof.

As shown in the drawing, the first ignition means chamber housing 22, having a two-step shape, abuts against a first igniter 21 at the opening, and has an outer peripheral surface 22a, corresponding to the first step, that abuts against the inner wall surface 13, and an outer peripheral surface 22b, corresponding to the second step, where there are provided a plurality of first communication holes 24; in addition, a protruding portion 27 is provided on the central portion of the top surface 22c of the first ignition means chamber housing 22. The first communication holes 24 directly oppose the inner wall surface 13.

The first intermediate chamber 30 is surrounded by a first retainer 32, the cylindrical housing 11 and a first ignition means chamber housing 22. The peripheral edge of the first retainer 32 fits against a step 14 provided in the wall surface of the cylindrical housing 11. A plurality of second communication holes 34 not facing the inner wall surface 13 are provided in the vicinity of the peripheral edge of the first retainer 32, except in the central portion thereof.

Neither the first ignition means chamber housing 22 nor the first retainer 32 can move in the axial direction of the cylindrical housing 11, since the protruding portion 27 in the first ignition means chamber housing 22 abuts against the first retainer 32, while the peripheral edge of the first retainer 32 fits against the step 14 and the opening of the first ignition means chamber housing 22 abuts against the first igniter 21.

Thus, in the gas generator of FIG. 6, the first communication holes 24 and the second communication holes 34 are arranged such that the directions of their openings are perpendicular to each other. Moreover, the cross-section area of the first intermediate chamber 30 in the axial direction of the housing (the cross-section area of the narrowest section, corresponding to A in FIG. 5) is larger than the total opening area of the second communication holes 34.

Part of all of the second communication holes 34 may also be provided in the vicinity of the central portion of the top surface of the first retainer 32 (around a position directly facing the protruding portion 27). By providing the holes in the vicinity of the central portion of the top surface, the circumventing distance of the ignition energy increases, further buffering its impact.

Gas Generator of FIG. 7

A first ignition means chamber 20 is surrounded by a first ignition means chamber housing 22 as a partitioning means, and a cylindrical housing 11, and accommodates therein a first igniter 21. The first igniter 21 is fixed together with a collar 29 by crimping end portion peripheral edge 15a of the cylindrical housing 11. Reference numeral 28 denotes an O-ring 28 for securing moisture-proof.

As shown in the drawing, the first ignition means chamber housing 22, having a two-step shape, abuts against a first igniter 21 at the opening portion, and has an outer peripheral surface 22a, corresponding to the first step, that abuts against the inner wall surface 13, and an outer peripheral surface 22b, corresponding to the second step, where there are provided a plurality of first communication holes 24. The first communication holes 24 directly oppose the inner wall surface 13.

The first intermediate chamber 30 is surrounded by a first retainer 32, the cylindrical housing 11 and a first ignition means chamber housing 22. The peripheral edge of the first retainer 32 fits against a step 14 provided in the wall surface of the cylindrical housing 11; in addition, a recess 32a (a protrusion in the direction of the first igniter 21) is also provided in the central portion of the first retainer 32. A plurality of second communication holes 34 not facing the inner wall surface 13 is provided in the vicinity of the peripheral edge of the first retainer 32, except in the central portion thereof.

Neither the first ignition means chamber housing 22 nor the first retainer 32 can move in the axial direction of the cylindrical housing 11, since the recess 32a of the first retainer 32 abuts against the top surface 22c of the first ignition means chamber housing 22, while the edge of the first retainer 32 fits against the step 14 and the opening portion of the first ignition means chamber housing 22 abuts against the first igniter 21.

Thus, in the gas generator of FIG. 7, the first communication holes 24 and the second communication holes 34 are arranged such that the directions of their openings are perpendicular to each other. Moreover, the cross-section area of the first intermediate chamber 30 in the axial direction of the housing (the cross-section area of the narrowest section, corresponding to A in FIG. 5) is larger than the total opening area of the second communication holes 34.

Gas Generator of FIG. 8

A first ignition means chamber 20 is surrounded by a first ignition means chamber housing 22 as a partitioning means, and a cylindrical housing 11, and accommodates therein a first igniter 21. The first igniter 21 is fixed together with a collar 29 by crimping end portion peripheral edge 15a of the cylindrical housing 11. Reference numeral 28 denotes an O-ring 28 for securing moisture-proof.

The first ignition means chamber housing 22, as shown in the drawing, abuts against a first igniter 21 at the opening portion, and has an outer peripheral surface 22a that abuts against the inner wall surface 13, and a top surface 22b where there are provided a plurality of first communication holes 24; in addition, a protruding portion 27 is provided on the central portion of the top surface 22b of the first ignition means chamber housing 22. The first communication holes 24 herein do not directly face the inner wall surface 13.

The first intermediate chamber 30 is surrounded by a first retainer 32, the cylindrical housing 11 and a first ignition means chamber housing 22.

As shown in the drawing, the first retainer 32 has a stepped shape and the peripheral edge thereof fits against a step 14 provided in the wall surface of the cylindrical housing 11. A plurality of second communication holes 34, directly facing the inner wall surface 13, are provided in the outer peripheral surface 34a of the step portion of the first retainer 32.

Neither the first ignition means chamber housing 22 nor the first retainer 32 can move in the axial direction of the cylindrical housing 11, since the protruding portion 27 of the first ignition means chamber housing 22 abuts against the top surface 32b of the first retainer 32, while the edge of the first retainer 32 fits against the step 14 and the opening portion of the first ignition means chamber housing 22 abuts against the first igniter 21.

Thus, in the gas generator of FIG. 8, the first communication holes 24 and the second communication holes 34 are arranged such that the directions of their openings are perpendicular to each other. Moreover, the cross-section area of the first intermediate chamber 30 in the axial direction of the housing (the cross-section area of the narrowest section, corresponding to A in FIG. 5) is larger than the total opening area of the second communication holes 34.

The operation of the gas generator for an air bag of FIG. 6 to 8 is identical to the operation of the gas generator 10 for an air bag of FIG. 5.

The invention claimed is:

1. A gas generator for an air bag, comprising:
a cylinder member having a gas discharge port;
an ignition means chamber provided inside the cylinder member and including ignition means;
a combustion chamber provided inside the cylinder member and adjacent to the ignition means chamber, and accommodating therein a gas generating agent ignited and burned by the ignition means; and
a retainer provided inside the cylinder member and separating the ignition means chamber and the combustion chamber, wherein
an inner wall surface of the cylinder member and the retainer defines a gas inflow space, in the combustion chamber, having a width smaller than the gas generating agent,
the ignition means chamber and the combustion chamber are in communication only through at least one communication hole, defined by the retainer, that directs the ignition energy into the gas inflow space, the communication hole faces the gas inflow space, and
an ignition energy generated by an activation of the ignition means inside the ignition means chamber flows into the gas inflow space via the communication hole, changes its flow direction by colliding against the inner wall surface, and causes the gas generating agent inside the combustion chamber to ignite and burn.

2. The gas generator for an air bag according to claim 1, wherein a size of the gas inflow space and a dimension of the gas generating agent are correlated.

3. The gas generator for an air bag according to claim 1, wherein the communication hole is directly opposite to the inner wall surface.

4. A gas generator for an air bag, comprising;
a housing including a cylindrical member and having a gas discharge port;
an ignition means chamber provided inside the cylindrical member and including ignition means, the ignition means chamber being defined inside an inner wall surface of the cylindrical member and a partition wall provided in the cylindrical member;
an intermediate chamber, accommodating a first gas generating agent, formed adjacent the ignition means chamber and defined by the partition wall and a retainer provided inside the cylindrical member, the ignition means chamber and the intermediate chamber being in communication through a first communication hole provided in the partition wall; and
a combustion chamber, accommodating a second gas generating agent, provided inside the cylindrical member and adjacent the intermediate chamber, the combustion chamber being defined by the inner wall surface of the cylindrical member and the retainer, the intermediate chamber and the combustion chamber being in communication through a second communication hole;
wherein the inner wall surface of the cylindrical member and the retainer define a gas inflow space, in the combustion chamber, having a width smaller than the second gas generating agent, and
an ignition energy generated by an activation of the ignition means inside the ignition means chamber flows into the intermediate chamber via the first communication hole and into the gas inflow space of the combustion chamber via the second communication hole to cause the second gas generating agent to ignite and burn.

5. The gas generator for an air bag according to claim 4, wherein a direction of the ignition energy from the ignition means chamber to the intermediate chamber and a direction of the ignition energy from the intermediate chamber to the combustion chamber are different.

6. The gas generator for an air bag according to claim 4 or 5, wherein the second communication hole faces an inner wall surface of the cylindrical member.

7. The gas generator for an air bag according to claim 4, wherein a combustion temperature of the first gas generating agent is higher than a combustion temperature of the second gas generating agent.

8. A gas generator for an air bag, comprising:
a housing having a gas discharge port;
an ignition means chamber provided inside the housing and including ignition means that generates ignition energy;
a combustion chamber provided inside the housing and adjacent to the ignition means chamber, and accommodating therein a gas generating agent ignited and burned by the ignition means, the combustion chamber having,
a gas-generating-agent space occupied by the gas generating agent and provided in an axial direction with respect to the ignition means chamber, and
a gas inflow space provided in a radially outward direction of the ignition means chamber and including therein no gas generating agent, the gas inflow space and the ignition means chamber being separated by a wall from each other and communicating with each other through a first communication hole provided in the wall, such that the first communication hole opposes an inner wall of the combustion chamber, the gas-generating-agent space and the gas inflow space forming a single continuous space without a wall provided therebetween,
wherein the ignition energy flows into the gas inflow space via the first communication hole, changes its flow direction by colliding against the inner wall, and flows into the gas-generating-agent space.

9. A gas generator for an air bag according to claim 8, wherein the gas inflow space is an annular gas inflow space.

10. A gas generator for an air bag according to claim 9, wherein a width of the gas inflow space is smaller than the gas generating agent provided in the gas-generating-agent space.

11. A gas generator for an air bag according to claim 8, wherein the ignition means chamber is divided into a first space where an igniter is provided and a second space where another gas generating agent is provided, and the first space is in communication with the second space through a second communication hole.

* * * * *